(12) United States Patent
Izumi

(10) Patent No.: US 9,758,055 B2
(45) Date of Patent: Sep. 12, 2017

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventor: Junta Izumi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/972,558

(22) Filed: Dec. 17, 2015

(65) Prior Publication Data

US 2016/0185250 A1    Jun. 30, 2016

(30) Foreign Application Priority Data

Dec. 24, 2014    (JP) ................ 2014-260843

(51) Int. Cl.
| | |
|---|---|
| B60L 11/00 | (2006.01) |
| B60L 11/18 | (2006.01) |
| B60W 20/00 | (2016.01) |
| B60W 10/06 | (2006.01) |
| B60W 10/08 | (2006.01) |
| B60W 10/30 | (2006.01) |
| H01M 10/625 | (2014.01) |
| B60W 20/13 | (2016.01) |

(52) U.S. Cl.
CPC ....... B60L 11/1874 (2013.01); B60L 11/1809 (2013.01); B60L 11/1861 (2013.01); B60W 10/06 (2013.01); B60W 10/08 (2013.01); B60W 10/30 (2013.01); B60W 20/00 (2013.01); B60W 20/13 (2016.01); H01M 10/625 (2015.04); *B60W 2510/244* (2013.01); *B60W 2510/246* (2013.01); *B60W 2710/246* (2013.01); *Y02T 10/6286* (2013.01); *Y10S 903/903* (2013.01)

(58) Field of Classification Search
None
See application file for complete search history.

(56) References Cited

U.S. PATENT DOCUMENTS

| | | | |
|---|---|---|---|
| 2009/0015205 A1 | 1/2009 | Katayama | |
| 2009/0024252 A1 | 1/2009 | Aridome et al. | |
| 2010/0089669 A1* | 4/2010 | Taguchi | B60H 1/00257 180/65.1 |

FOREIGN PATENT DOCUMENTS

| | | |
|---|---|---|
| JP | 2005204481 A | 7/2005 |
| JP | 2007-196876 A | 8/2007 |
| JP | 2007200780 A | 8/2007 |
| JP | 2007-336691 A | 12/2007 |
| JP | 2011121415 A | 6/2011 |
| JP | 2014-189147 A | 10/2014 |

* cited by examiner

*Primary Examiner* — Angela Ortiz
*Assistant Examiner* — Garrett Evans
(74) *Attorney, Agent, or Firm* — Oliff PLC

(57) ABSTRACT

A control system for a hybrid vehicle includes an internal combustion engine, a rotary electric machine, a battery, a cooling fan configured to cool the battery, and a controller. The controller is configured to determine an operation of the cooling fan based on charged-discharged electric power of the battery and presence or absence of a charging request that is based on an intention of a user. The controller is configured to control the operation of the cooling fan such that the battery is cooled more in a case where the charging request is present than in a case where the charging request is absent with the same charged-discharged electric power.

10 Claims, 6 Drawing Sheets

CONTROL SYSTEM FOR HYBRID VEHICLE

INCORPORATION BY REFERENCE

The disclosure of Japanese Patent Application No. 2014-260843 filed on Dec. 24, 2014 including the specification, drawings and abstract is incorporated herein by reference in its entirety.

BACKGROUND OF THE INVENTION

1. Field of the Invention

The invention relates to a control system for a hybrid vehicle that has an internal combustion engine and a rotary electric machine for driving the vehicle and in particular to a control system for cooling a battery that receives electric power from the rotary electric machine and transmits electric power to the rotary electric machine.

2. Description of Related Art

A vehicle that includes an internal combustion engine and a rotary electric machine as prime movers for driving the vehicle, that is, a so-called hybrid vehicle has been known. In this specification, the "rotary electric machine" is used as a collective term for a motor, a generator, and further electrical equipment that functions as both of the motor and the generator. The hybrid vehicle has a battery that receives/transmits electric power from/to the rotary electric machine. Japanese Patent Application Publication No. 2014-189147 (JP 2014-189147 A) below discloses a hybrid vehicle in which a power storage amount of the battery is increased in response to a request of a vehicle user (a driver, for example).

In the case where an increase in the power storage amount is requested and the battery is thus charged, there is a high possibility that the vehicle is thereafter driven and the vehicle travels only by using the rotary electric machine. In the travel for which only the rotary electric machine is used, output of the rotary electric machine is increased. Thus, there is a case where the battery generates heat as a result of supplying a large amount of the electric power to the rotary electric machine and a temperature of the battery is increased.

SUMMARY OF THE INVENTION

The invention provides a control system that suppresses a temperature increase of a battery in a travel after charging of the battery on the basis of a request of a vehicle user or in a travel for which use of a rotary electric machine only is predicted.

An aspect of a control system related to the present invention includes an internal combustion engine, a rotary electric machine, a battery, a cooling fan, and a controller. The internal combustion engine is for driving the vehicle. The rotary electric machine is for driving the vehicle. The battery is configured to receive electric power from the rotary electric machine and transmit electric power to the rotary electric machine. The cooling fan is configured to cool the battery. The controller is configured to determine an operation of the cooling fan based on charged-discharged electric power of the battery and presence or absence of a charging request that is based on an intention of a user. The controller is configured to control the operation of the cooling fan such that the battery is cooled more in a case of i) than in a case of ii) with the same charged-discharged electric power; i) the charging request is present, ii) the charging request is absent. According to the control system of this aspect, the cooling fan is operated such that the battery is cooled more in order to prepare for a high output operation of the rotary electric machines after the charging request based on the intention of the user is made. As a result, a temperature increase of the battery can be suppressed. That is, according to this control system, when the rotary electric machines are possibly operated at high output in a future, the temperature increase of the battery during the high output operation is suppressed by suppressing the temperature increase of the battery in advance.

Another aspect of the control system related to the present invention includes an internal combustion engine, a rotary electric machine, a battery, a cooling fan, a switch, and a controller. The internal combustion engine is for driving the vehicle. The rotary electric machine is for driving the vehicle. The battery is configured to receive electric power from the rotary electric machine and transmit electric power to the rotary electric machine. The cooling fan is configured to cool the battery. The switch is configured to issue a command of an increasing operation of a power storage amount of the battery. The controller is configured to determine an operation of the cooling fan based on charged-discharged electric power of the battery and an on-off state of the switch. The controller is configured to control the operation of the cooling fan such that the battery is cooled more in a case of i) than in a case of ii) with the same charged-discharged electric power; i) the switch is in the on state, and ii) the switch is in the off state. According to the control system of this aspect, the cooling fan is operated such that the battery is cooled more in order to prepare for the high output operation of the rotary electric machines after the switch is turned into the on state. As a result, the temperature increase of the battery can be suppressed. That is, according to this control system, when the rotary electric machines are possibly operated at the high output in the future, the temperature increase of the battery during the high output operation is suppressed by suppressing the temperature increase of the battery in advance.

Further, another aspect of a control system related to the present invention includes an internal combustion engine, a rotary electric machine, a battery, a cooling fan, and a controller. The internal combustion engine is for driving the vehicle. The rotary electric machine is for driving the vehicle. The battery is configured to receive electric power from the rotary electric machine and transmit electric power to the rotary electric machine. The cooling fan is configured to cool the battery. The controller is configured to predict whether a travel only by the rotary electric machine will be made in the future and configured to determine an operation of the cooling fan based on charged-discharged electric power of the battery and a prediction of the travel only by the rotary electric machine. The controller is configured to control the operation of the cooling fan such that the battery is cooled more in a case of i) than in a case of ii) with the same charged-discharged electric power; i) the travel only by the rotary electric machine is predicted, and ii) the travel only by the rotary electric machine is not predicted. According to the control system of this aspect, in the case where the travel by the rotary electric machines only is predicted, the cooling fan is operated such that the battery is cooled more in order to prepare for the high output operation of the rotary electric machines at the time. As a result, the temperature increase of the battery can be suppressed. That is, according to this control system, when the rotary electric machines are possibly operated at the high output in the future, the temperature increase of the battery during the high output operation is suppressed by suppressing the temperature increase of the battery in advance.

The controller may be configured to set a lower limit temperature at which the cooling fan is operated to be lower in the case of i) than in the case of ii). Because cooling by the cooling fan is performed from a state where a temperature of the battery is low, the temperature increase of the battery is suppressed.

The controller may be configured to control an air volume of the cooling fan to be larger in the case of i) than in the case of ii). Because the air volume for the battery is increased, the temperature increase of the battery is suppressed.

The controller may be configured to obtain a speed of the vehicle, and the controller may be configured to increase the air volume of the cooling fan as the vehicle speed becomes higher in the case of i).

The controller may be configured to obtain output of the internal combustion engine. The controller may be configured to increase the air volume of the cooling fan as output of the internal combustion engine becomes higher in the case of i).

The hybrid vehicle may be configured to travel by switching between an EV mode and an HV mode. The EV mode may be a mode in which the vehicle is driven only by the rotary electric machine. The HV mode may be a mode in which the vehicle is driven by selectively using or using both of the rotary electric machines and the internal combustion engine in accordance with a situation. The controller may be configured to increase the air volume of the cooling fan as output of the internal combustion engine becomes higher, in the case of i) and the vehicle travels in the HV mode.

According to the control system in any of the above aspects, when the rotary electric machines are possibly operated at the high output in the future, such as by the charging request of the battery from the user, the on state of the switch for commanding the increase in the power storage amount, and the prediction of the travel by the rotary electric machines only, the temperature increase of the battery during the high output operation is suppressed by suppressing the temperature increase of the battery before the high output operation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
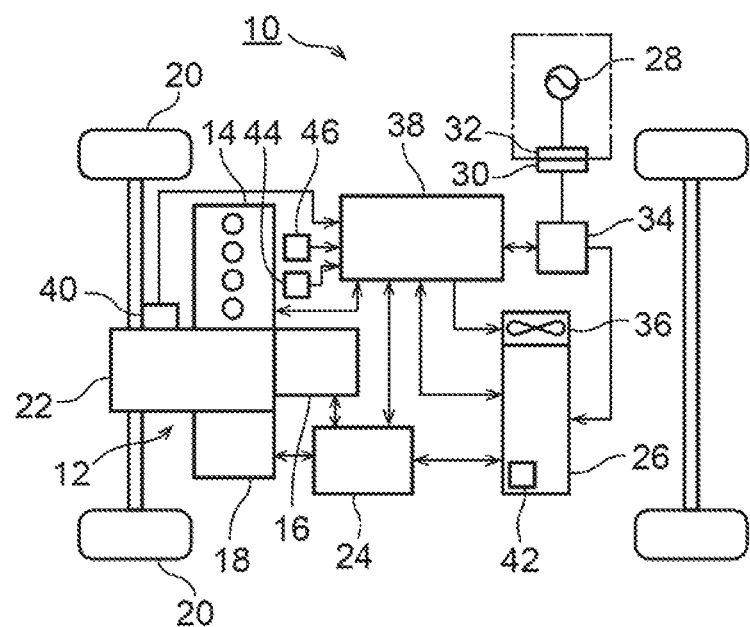
FIG. 1 is a view of a schematic configuration of a vehicle according to the invention.

A description will hereinafter be made on an embodiment of the invention in accordance with the drawings. FIG. 1 is a view of a schematic configuration of a vehicle 10 according to the invention. The vehicle 10 is a so-called plug-in hybrid vehicle that can be charged by an external power supply such as a commercial power supply. A power apparatus 12 for driving the vehicle 10 has an internal combustion engine 14 and two units of rotary electric machines 16, 18 as prime movers for driving the vehicle. The power apparatus 12 further includes a power split device 22 that causes power to be transmitted among the three units of the prime movers 14, 16, 18 and between each of these prime movers and drive wheels 20. The power split device 22 has a planetary gear unit, the one rotary electric machine 16 is connected to a sun element of the planetary gear unit, the internal combustion engine 14 is connected to a planetary element, and the other rotary electric machine 18 is connected to a ring element. The rotary electric machine 16 that is connected to the sun element is described as the first rotary electric machine 16, and the rotary electric machine 18 that is connected to the ring element is described as the second rotary electric machine 18. The ring element is connected to the drive wheels 20 via a speed reduction mechanism that is provided in the power split device 22. Electric power is supplied from a battery 26 to the first and second rotary electric machines 16, 18 via a power converter 24. In addition, the electric power that is generated by the first and second rotary electric machines 16, 18 is stored in the battery 26. The power converter 24 includes an inverter that converts DC power supplied from the battery 26 to AC power and reversely converts the AC power generated by the first and second rotary electric machines 16, 18 to the DC power. The battery 26 is a secondary battery, for example.

The power split device 22 can divide output of the internal combustion engine 14 into output for driving the first rotary electric machine 16 and output that is transmitted to the drive wheels 20 so as to drive the vehicle. At this time, the first rotary electric machine 16 functions as a generator, and the generated power is stored in the battery 26. The power split device 22 can simultaneously transmit the output of the internal combustion engine 14 and output of the second rotary electric machine 18 to the drive wheels 20. In addition, the second rotary electric machine 18 can function as a generator when the second rotary electric machine 18 is driven by an inertial force of the vehicle via the drive wheels 20. The generated power is stored in the battery 26. This is so-called regenerative braking in which a vehicle speed is reduced by converting kinetic energy of the vehicle into electric energy.

A configuration of the power apparatus 12 is not limited to the above-described configuration. For example, the power apparatus 12 may adopt such a configuration that the internal combustion engine drives the generator and the vehicle is driven by a motor that is driven by the generated electric power. In this case, the internal combustion engine and the generator do not directly drive the vehicle; however, the internal combustion engine and the generator indirectly contribute to driving of the vehicle by supplying the electric power to the motor that drives the vehicle. Here, such prime movers (the internal combustion engine and the generator) are also included as the prime movers for driving the vehicle. In addition, the power apparatus 12 may be constructed of one unit of the internal combustion engine and one unit of the rotary electric machine.

A mode in which the vehicle travels by the rotary electric machines only is hereinafter described as an "EV mode". A mode in which the vehicle travels by using both of the rotary electric machines and the internal combustion engine is described as an "HV mode". In the HV mode, on the basis of a travel status of the vehicle, such as the vehicle speed and a power storage amount of the battery, and a request of a driver, the vehicle is driven by separately using the rotary electric machines and the internal combustion engine or by concurrently using both of them. Also in the HV mode, the vehicle is driven by the rotary electric machines only during a low-speed travel, for example. However, during a low-speed travel, the vehicle is in such a state that the internal combustion engine is started in accordance with the status. Thus, the travel in this case where only the rotary electric machine is used is not included in the EV mode.

In the vehicle 10, the battery 26 can be charged by an external power supply 28. A charging connector 32 that is connected to the external power supply 28 is connected to a charging inlet 30 provided in the vehicle 10. In this way, charging is performed via a charger 34. In addition, a cooling fan 36 for cooling the battery 26 is provided.

The vehicle 10 has a controller 38 for controlling operations of the internal combustion engine 14 and the first and second rotary electric machines 16, 18 on the basis of a request of a vehicle user (the driver, for example) and the status of the vehicle. The request of the driver can be understood on the basis of operations of an accelerator pedal, a brake pedal, a shift lever, and the like. As the status of the vehicle, for example, a speed of the vehicle (the vehicle speed), the power storage amount and a temperature of the battery 26, and the like can be raised. The vehicle speed can be detected by a vehicle speed sensor 40 that detects a rotational speed of the drive wheel 20 or an element that rotates in a specified speed relationship therewith. The controller 38 functions as a vehicle speed obtaining section for obtaining the speed of the vehicle on the basis of a signal from the vehicle speed sensor 40. The power storage amount of the battery 26 can be calculated on the basis of a terminal voltage of the battery 26 or the electric power that is input to the battery 26 and output from the battery 26. This calculation may be performed by the controller 38. The temperature of the battery 26 can be detected by a temperature sensor 42 that is provided in the battery 26 and can be obtained by the controller 38. In addition, the controller 38 controls an operation of the cooling fan 36 on the basis of a state of the battery 26, for example, the charged-discharged electric power or the temperature of the battery 26 at the time. At this time, the controller 38 functions as a cooling fan operation controller. For example, on the basis of a relationship between the charged-discharged electric power of the battery 26 and an air volume of the cooling fan 36 that is defined in advance, the controller 38 controls the cooling fan 36 such that the air volume corresponds to the charged-discharged electric power at the time. Furthermore, the controller 38 defines a relationship between the temperature of the battery 26 and the air volume of the cooling fan 36 in advance and controls the cooling fan 36 such that the air volume corresponds to the temperature at the time.

As the request of the driver, in addition to the above-described accelerator pedal and the like, a mode switching switch 44 for switching between the EV mode and the HV mode and a recovery switch 46 for increasing the power storage amount of the battery 26 so as to recover the battery 26 to a fully charged state or the power storage amount close to the fully charged state may be included. When the driver operates the mode switching switch 44, the mode is switched from the EV mode to the HV mode or from the HV mode to the EV mode in this vehicle 10. In addition, when the driver operates the recovery switch 46, each of the prime movers 14, 16, 18 is controlled to increase the power storage amount of the battery 26 such that the power storage amount corresponds to full charging or close thereto. That is, when the recovery switch 46 is operated and turned into an on state, the operation of each of the prime movers 14, 16, 18 is controlled such that the battery 26 is charged. The operation of each of the prime movers 14, 16, 18 and that of the other equipment on the basis of the on state of the recovery switch 46 will hereinafter be described as a "recovery operation". The charging does not always have to be performed when the recovery switch 46 is in the on state. The controller 38 controls the operation of each of the prime movers 14, 16, 18 such that the charging is performed or a charging opportunity is increased in accordance with the status of the vehicle. For example, the charging may not be performed in a state where the accelerator pedal is no longer depressed, and a charged amount may be increased at a stage where the brake pedal is depressed such that a larger regenerative braking force than that during an off state of the recovery switch 46 is generated. The recovery switch 46 is a power storage amount increasing switch for issuing a command when turned into the on state such that each of the prime movers 14, 16, 18 increases the power storage amount of the battery 26. In addition, when the recovery switch 46 is in the on state, it can be determined that the driver requests the charging of the battery 26.

The controller 38 controls each of the prime movers 14, 16, 18, the battery 26, and the like on the basis of the grasped request of the driver and the grasped status of the vehicle. The vehicle 10 travels by using the electric power that is stored through external charging when the power storage amount of the battery 26 is sufficient due to the external charging. At this time, the vehicle is essentially driven by the rotary electric machines only. In addition, after the electric power that is stored through the external charging is consumed, that is, after the power storage amount becomes a specified value or lower, such control is executed that required drive power is obtained from the rotary electric machines and the internal combustion engine and the power storage amount of the battery falls within a specified range. In the case where the battery 26 is in the fully charged state or a state close to the fully charged state at a start of an operation of this vehicle 10, the vehicle 10 first travels by using the second rotary electric machine 18 only. When it is determined as a status where high output is required, such as a case of a high speed (100 km/h, for example) or higher or a case where the driver requests rapid acceleration, the internal combustion engine 14 is started. There is also a case where the internal combustion engine 14 is started due to a request from a built-in air conditioner or due to a condition such as the temperature of the battery 26 or the internal combustion engine 14 (a case of a low temperature) and the like. When the power storage amount is reduced to the specified value, for example, 60%, the vehicle is driven either by one of or both of the internal combustion engine 14 and the second rotary electric machine 18. Which prime mover is used is determined in advance in correspondence with the request of the driver and the status of the vehicle.

For example, the internal combustion engine 14 is not used, but the second rotary electric machine 18 is used to drive the vehicle during the low-speed travel. When the vehicle speed becomes a specified speed or higher, the internal combustion engine 14 is started, and the vehicle is driven by using both of them. In addition, when the power storage amount is reduced to the specified value, for example, 40%, the first rotary electric machine 16 is driven to generate the electric power by using some of the output of the internal combustion engine 14 and stores the electric power in the battery 26.

The mode can be switched to a mode requested by the driver when the driver operates the mode switching switch 44. When the mode switching switch 44 is operated during the operation in the HV mode, the vehicle can be driven in the EV mode, that is, by the second rotary electric machine 18 only. In the EV mode, the internal combustion engine 14 is not operated. Thus, noise can be reduced. When the mode switching switch 44 is operated again, the mode can be resumed to the HV mode. In addition, when the mode switching switch 44 is operated during the operation in the EV mode, the mode can be shifted to the HV mode. The power storage amount of the battery 26 can be saved by traveling in the HV mode. When the mode switching switch 44 is operated again, the mode can be resumed to the EV mode.

The recovery switch 46 is a switch that is used to request the charging of the battery 26. In the on state, the charging is promoted, and the power storage amount of the battery 26 is increased. When the recovery switch 46 is operated to be in the on state, the operation of each of the prime movers 14, 16, 18 is controlled such that the power storage amount is increased. More specifically, the charging is performed through the power generation by the first rotary electric machine 16, through an increase in the braking force in the regenerative braking, or the like so as to increase the power storage amount. The controller 38 determines that a charging request is made when the recovery switch 46 is turned into the on state, and issues a command such that each of the prime movers 14, 16, 18 is operated to increase the power storage amount. In the operation after the electric power that is charged externally is consumed, when the recovery switch 46 is operated, an upper limit value of the power storage amount is set to be higher than a normal upper limit value, and the charging is performed until the power storage amount reaches the changed upper limit value. Because the upper limit value is set higher, each of the prime movers 14, 16, 18 is controlled with the upper limit value as a target and thus is controlled such that the power storage amount is increased. For example, it is assumed that the power storage amount is managed to fall within a range from 40 to 60% in the off state of the recovery switch 46. When the recovery switch 46 is turned into the on state, the normal upper limit value (60%) of the power storage amount is changed to the full charging or a value close to the full charging (90%, for example).

In the case where the recovery switch 46 is operated while the vehicle is operated by using the electric power that is externally charged, such control that the power storage amount of the battery 26 is not reduced is executed. For example, the vehicle is driven by drive power of the internal combustion engine 14. In order to start the internal combustion engine 14, the controller 38 switches the mode to the HV mode. Meanwhile, when the vehicle travels on a long downward slope, the internal combustion engine 14 is not started, that is, switching to the HV mode is not made. Instead, a power generation amount by the second rotary electric machine 18 during the regenerative braking is increased, so as to recover the power storage amount.

When the driver operates the recovery switch 46 to be in the on state, there is a high possibility that the driver thinks about the subsequent travel in the EV mode. That is, when the recovery switch 46 is turned into the on state, it is predicted that the vehicle would travel in the EV mode from the time onward. In a case of the travel in the EV mode, it is anticipated that the electric power supplied from the battery 26 to the second rotary electric machine 18 is increased and the temperature of the battery 26 is thus increased. When the temperature is increased, deterioration of the battery 26 is accelerated. Thus, in order to suppress the deterioration, it is desired to suppress a temperature increase. In view of this, the battery 26 starts being cooled during the recovery operation of the power storage amount, and the temperature of the battery 26 at a time point that the travel in the EV mode is started is thereby lowered. In this way, the temperature of the battery 26 during the travel in the EV mode can be lowered in comparison with a case where the battery 26 is not cooled in advance. For example, in the case where cooling capacity with respect to the battery 26 during the travel in the EV mode is insufficient, a part of the lacking cooling capacity can be compensated by cooling in advance.

Figure 2:
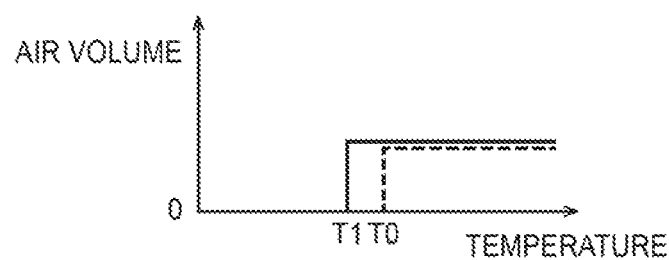
FIG. 2 is a chart of one example of air volume control for lowering an operation lower limit temperature of a cooling fan.

The cooling fan 36 cools the battery 26. When the recovery switch 46 is operated to be in the on state and the recovery operation is performed, as shown in FIG. 2, an operation lower limit temperature of the cooling fan 36 is changed to a temperature T1 that is lower than a normal temperature T0. For example, a normal setting for stopping the cooling fan 36 when the temperature of the battery 26 is 34° C. or lower is changed to a setting for stopping the cooling fan 36 when the temperature of the battery 26 is 30° C. or lower. In this way, an opportunity of operating the cooling fan 36 is increased, and thus the battery 26 is further cooled. Because the operation opportunity of the cooling fan 36 is increased, the cooling capacity for a relatively long time is enhanced without changing the air volume of the cooling fan 36 (that is, without enhancing the instantaneous cooling capacity). Accordingly, control for changing the operation lower limit temperature of the cooling fan in the on state to be the lower temperature than that in the off state of the recovery switch 46 corresponds to cooling enhancement control for further cooling the battery 26. The temperature increase of the battery 26 is suppressed by this cooling enhancement control. Alternatively, a temperature at which the cooling fan 36 starts being operated may be increased to be higher than a temperature at which the cooling fan 36 is stopped (increased by 2° C., for example), and in this way, frequent switching of on-off operations may be prevented. The air volume at a time that the cooling fan 36 is operated (is on) may be a fixed value. In addition, the air volume may be a value that is changed in accordance with the charged-discharged electric power of the battery 26 at the time. Furthermore, the air volume may be a value that is changed in accordance with the temperature of the battery 26.

Figure 3:
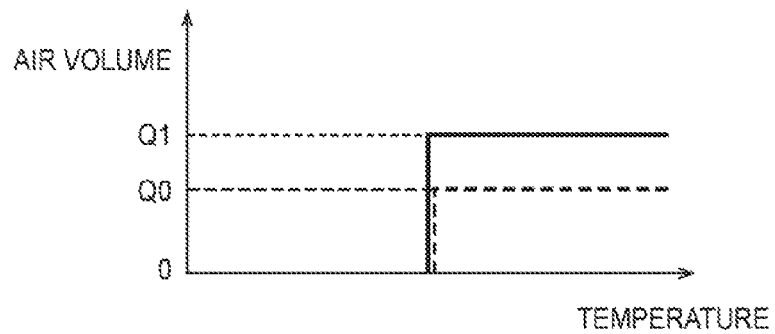
FIG. 3 is a chart of one example of the air volume control for increasing an air volume of the cooling fan.

In addition, as shown in FIG. 3, during the recovery operation, the air volume of the cooling fan may be set to an air volume Q1 that is increased from a normal air volume Q0. The normal air volume Q0 is an air volume that is determined on the basis of information that is other than information on whether it is currently in the recovery operation (more specifically, the on-off state of the recovery switch 46), for example, information on the charged-discharged electric power or the temperature of the battery 26 at the time. During the recovery operation, the charging opportunity of the battery 26 is increased, and the charged electric power is increased. In the case where the air volume is changed in accordance with the charged-discharged electric power, the air volume is increased due to the increase in the charged electric power by the recovery operation. At this time, the controller 38 increases the air volume to be larger than the above increase, so as to prepare for the future temperature increase by the EV mode. A similar case is applied to the temperature of the battery 26. The charging opportunity is increased by the recovery operation, and the temperature is thereby increased. At this time, the air volume is increased to be larger than the air volume that is increased by the temperature increase, so as to prepare for the future temperature increase by the EV mode. Just as described, control for increasing the air volume to be larger than the air volume that is determined on the basis of the information on the charged-discharged electric power or the temperature during the on state of the recovery switch 46 corresponds to the cooling enhancement control for further cooling the battery 26. The air volume at the time that the cooling fan 36 is operated (is on) may be the fixed value. In addition, the air volume may be the value that is changed in accordance with the charged-discharged electric power of the battery 26 at the time. Furthermore, the air volume may be the value that is changed in accordance with the temperature of the battery 26. This control for increasing the air volume may be executed together with the above-described control for lowering the operation lower limit temperature.

Figure 4:
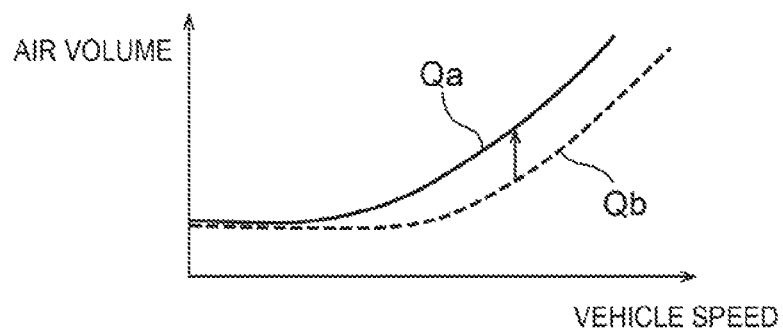
FIG. 4 is a chart of one example of the air volume control for increasing the air volume of the cooling fan in response to an increase in a vehicle speed.

The air volume of the cooling fan 36 may be changed in accordance with the vehicle speed. A curve Qa shown in FIG. 4 indicates the air volume of the cooling fan 36 during the recovery operation and also indicates such a characteristic that the air volume is increased as the vehicle speed is increased. The controller 38 obtains the vehicle speed on the basis of output of the vehicle speed sensor 40 and controls the cooling fan 36 in accordance with the vehicle speed so as to output the predetermined air volume indicated by the curve Qa. Because travel noise is low at the low vehicle speed, the air volume of the cooling fan 36 is reduced to prevent the noise from standing out. On the contrary, when the vehicle speed is high and the travel noise is loud, the noise of the cooling fan 36 does not stand out by being blended into the travel noise. Accordingly, the air volume is increased, and the cooling capacity is enhanced. Control of the air volume with respect to the vehicle speed may be control for increasing the air volume in stages, in addition to control for continuously increasing the air volume as shown in FIG. 4. In addition, control for increasing the air volume to be larger than that during a normal time can be executed during the recovery operation of the power storage amount. A curve Qb that is represented by a broken line in FIG. 4 indicates the air volume during the normal time. During the recovery operation, control for prioritizing the cooling capacity over the noise of the cooling fan 36 by the increase in the air volume is executed.

Figure 5:
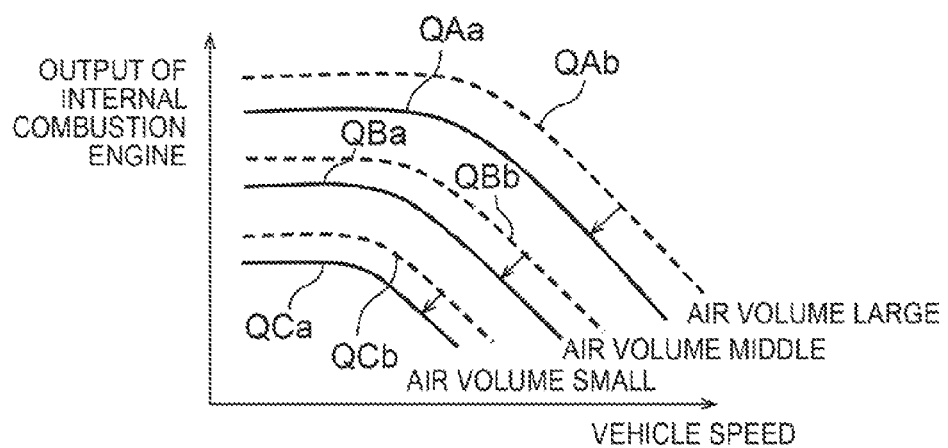
FIG. 5 is a chart of one example of the air volume control for increasing the air volume of the cooling fan in response to the increase in the vehicle speed and an increase in output of an internal combustion engine.

Furthermore, the air volume of the cooling fan 36 may be changed on the basis of the vehicle speed and the output of the internal combustion engine. The air volume can be increased when the output of the internal combustion engine 14 is high and the vehicle speed is high. In FIG. 5, a curve QAa, a curve QBa, and a curve QCa respectively indicate characteristics of the large, middle, and small air volumes. The controller 38 obtains the vehicle speed on the basis of the output of the vehicle speed sensor 40. In addition, the controller 38 controls the output of the internal combustion engine 14 in accordance with the request of the driver and the status of the vehicle, and obtains the output of the internal combustion engine 14 on the basis of this control command. The controller 38 controls the cooling fan 36 to output the air volume that corresponds to the obtained vehicle speed and the obtained output of the internal combustion engine 14 in advance. It can be understood from FIG. 5 that the air volume is increased as the output of the internal combustion engine 14 is increased when the vehicle speed is the same and that the air volume is increased as the vehicle speed is increased when the output of the internal combustion engine is the same. When the output of the internal combustion engine is increased, the noise caused by the internal combustion engine is increased in conjunction with the increase in the output. When the output of the internal combustion engine 14 is low, the noise thereof is low. Accordingly, the air volume is reduced to prevent the noise of the cooling fan 36 from standing out. When the output of the internal combustion engine 14 is increased, the noise of the cooling fan 36 does not stand out by being blended into the noise of the internal combustion engine 14. Accordingly, the air volume is increased, and the cooling capacity is enhanced. The air volume can continuously be increased with respect to engine output and the vehicle speed or can be increased in stages. In addition, the control for increasing the air volume to be larger than that during the normal time can be executed during the recovery operation of the power storage amount. A curve QAb, a curve QBb, and a curve QCb that are represented by broken lines in FIG. 5 each indicate a characteristic of the air volume during the normal time and respectively indicate the air volumes that are equal to the curve QAa, the curve QBa, and the curve QCa during the recovery operation. During the recovery operation, the control for prioritizing the cooling capacity over the noise of the cooling fan 36 by the increase in the air volume is executed.

Figure 6:
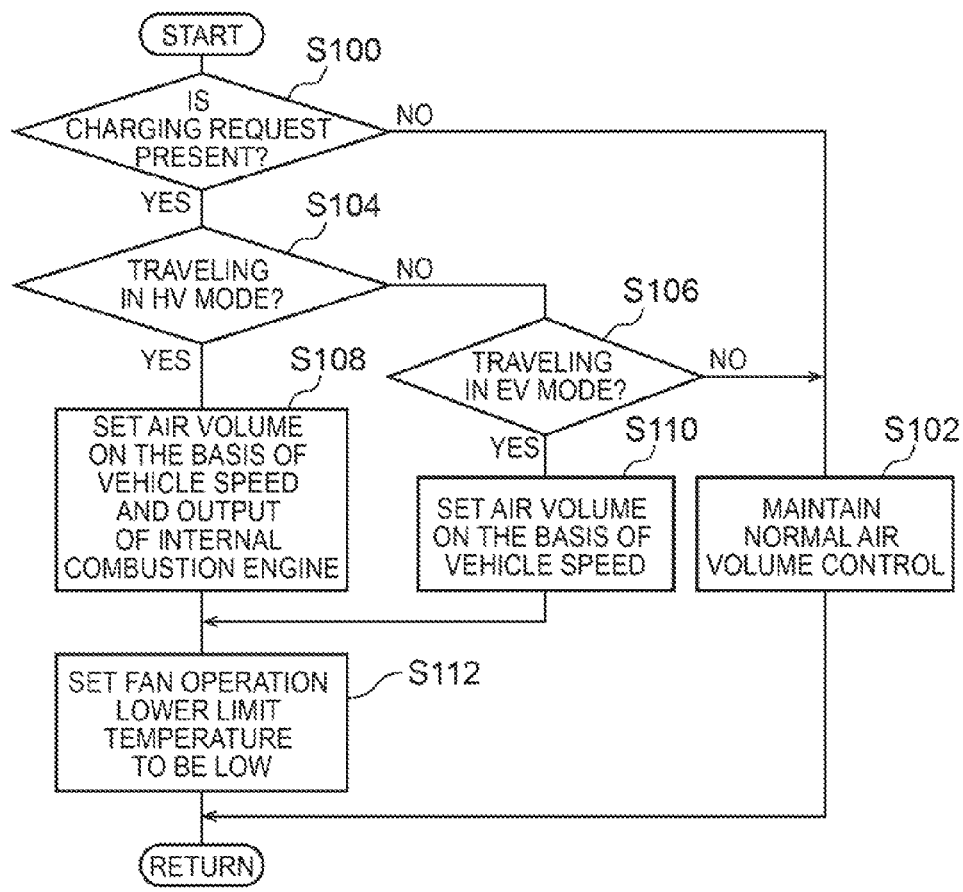
FIG. 6 is a chart of one example of a processing flow for setting the air volume of the cooling fan.

FIG. 6 is a chart of one example of a processing flow of a sub routine related to setting of the operation of the cooling fan 36 in the vehicle 10. This flow is executed by the controller 38. The controller 38 determines whether the driver requests the charging of the battery 26 (S100). Presence or absence of the charging request can be determined by the on-off state of the recovery switch 46, and it can be determined that the charging request by the driver is present in the on state. If the recovery switch 46 is not in the on state, the normal air volume control, that is, the control for determining the air volume on the basis of the information other than the charging request by the driver is maintained (S102). If the recovery switch 46 is in the on state, it is determined that the charging request is present, and it is next determined whether the vehicle travels in the HV mode (S104) or travels in the EV mode (S106). In the case where the mode is neither the HV mode nor the EV mode (at the time of the charging by the external power supply, for example), the normal air volume control is executed even when the recovery switch 46 is in the on state (S102). If it is determined in step S104 that the vehicle travels in the HV mode, the air volume is set on the basis of the vehicle speed and the output of the internal combustion engine (S108). For example, corresponding table data that indicates a corresponding relationship between each of the vehicle speed and the output of the internal combustion engine and the air volume as shown in FIG. 5 is stored in advance, and the corresponding air volume is set from the vehicle speed and the output of the internal combustion engine at the time. When the air volume is set in step S108, information that is used for the setting of the air volume in the normal air volume control may be used in addition to the information on the vehicle speed and the output of the internal combustion engine. When it is determined in step S106 that the vehicle travels in the EV mode, the air volume is set on the basis of the vehicle speed (S110). For example, corresponding table data that indicates a corresponding relationship between the vehicle speed and the air volume as shown in FIG. 4 is stored in advance, and the air volume that corresponds to the vehicle speed at the time is set. When the air volume is set in step S110, information that is used for the setting of the air volume in the normal air volume control may be used in addition to the information on the vehicle speed. When the air volume is set in step S108 or step S110, the operation lower limit temperature of the cooling fan is set to be lower than that during the normal time (S112). In FIG. 6, it is illustrated that step S112 is processed after steps S108, S110. However, the order may be reversed. The operation of the cooling fan 36 is controlled on the basis of the changed setting.

Figure 7:
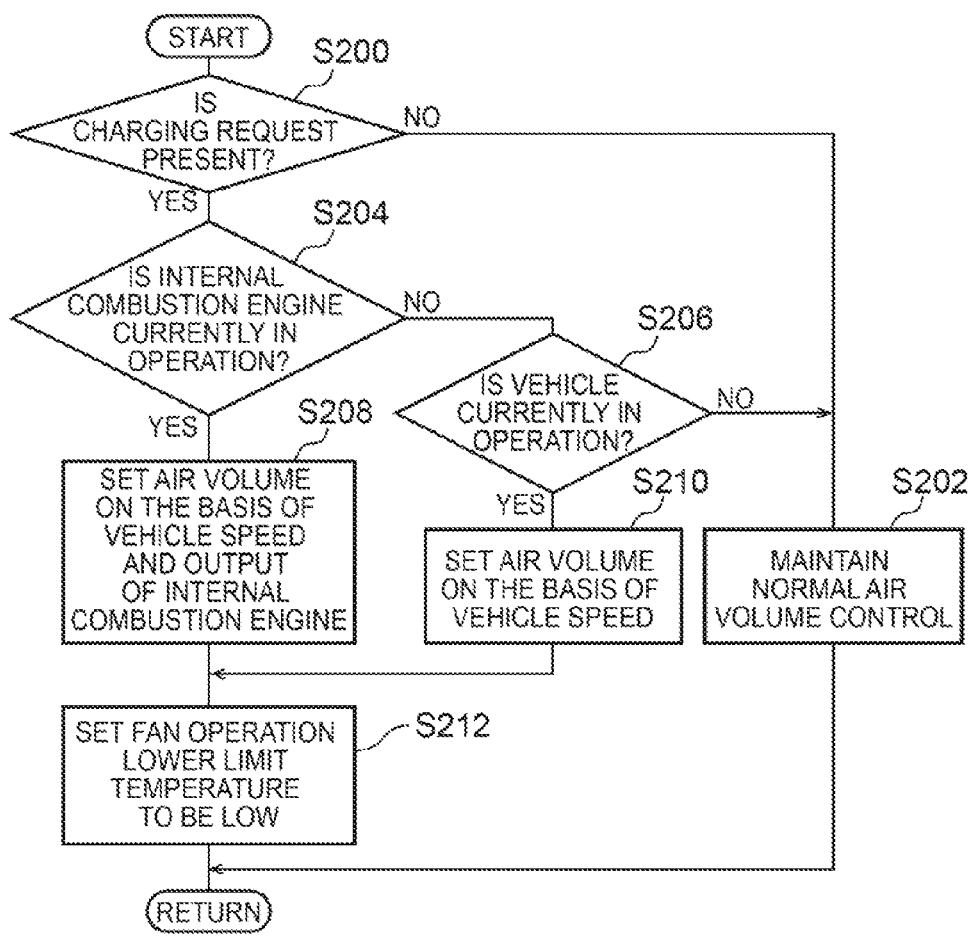
FIG. 7 is a chart of one example of the processing flow for setting the air volume of the cooling fan.

FIG. 7 is a chart of another example of the processing flow of the sub routine related to the setting of the operation of the cooling fan 36 in the vehicle 10. This processing is executed by the controller 38. The controller 38 determines whether the driver requests the charging of the battery 26 (S200). Presence or absence of the charging request can be determined by the on-off state of the recovery switch 46, and it can be determined that the charging request by the driver is present in the on state. If the recovery switch 46 is not in the on state, the normal air volume control, that is, the control for determining the air volume on the basis of the information other than the charging request by the driver is maintained (S202). When the recovery switch 46 is in the on state, it is determined that the charging request is present, and it is next determined whether the internal combustion engine 14 is currently in operation (S204). If it is determined in step S204 that the internal combustion engine 14 is currently in operation, the air volume is set on the basis of the vehicle speed and the output of the internal combustion engine (S208). This setting of the air volume is the same as that in above-described step S108. On the other hand, if it is determined in step S204 that the internal combustion engine is not currently in operation, it is determined whether the vehicle is currently in operation (S206). In the case where the vehicle is not currently in operation (at the time of the charging by the external power supply, for example), the normal air volume control is executed even when the recovery switch 46 is operated to be on (S202). If the vehicle is currently in operation in step S206, the air volume is set on the basis of the vehicle speed (S210). This setting of the air volume is the same as that in above-described step S110. In addition, the operation lower limit temperature of the cooling fan is set to be lower than that during the normal time (S212). In FIG. 7, it is illustrated that step S212 is processed after steps S208, S210. However, the order may be reversed, or step S212 may be processed immediately after step S200. The operation of the cooling fan 36 is controlled on the basis of the changed setting.

Figure 8:
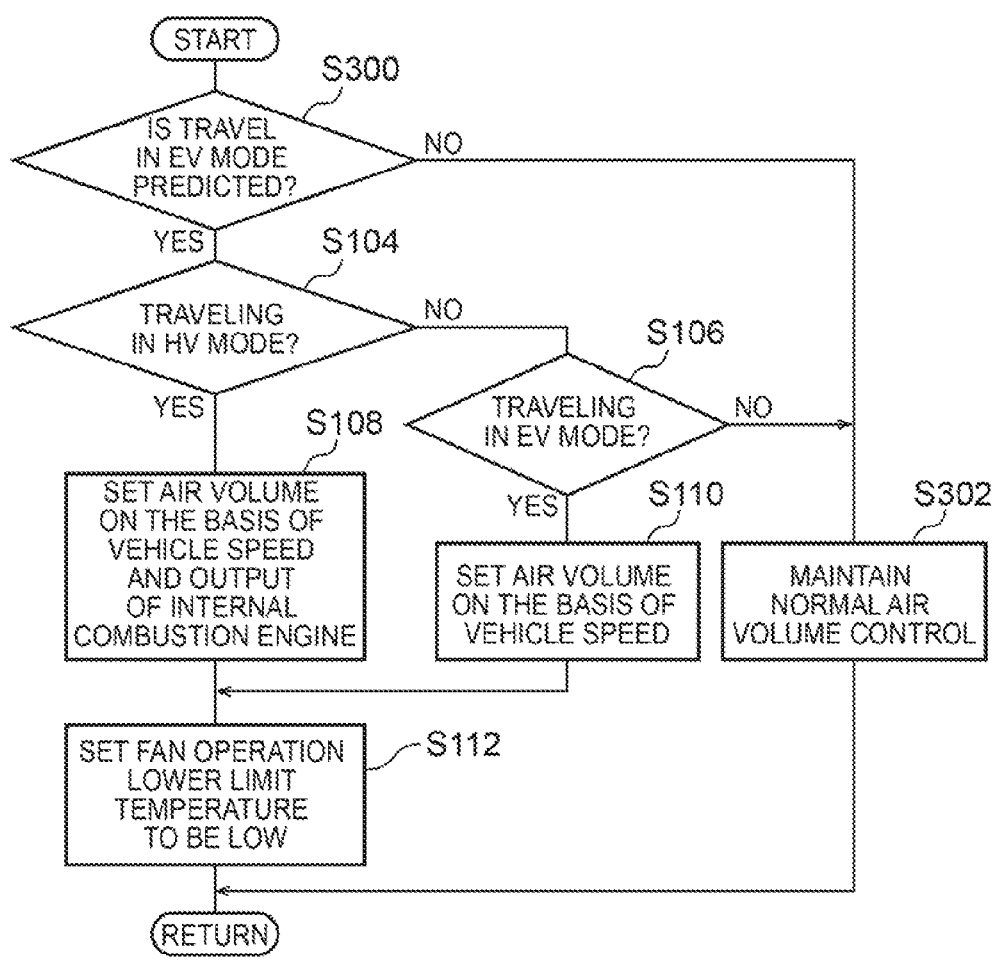
FIG. 8 is a chart of one example of the processing flow for setting the air volume of the cooling fan.

FIG. 8 is a chart of yet another example of the processing flow of the sub routine related to the setting of the operation of the cooling fan 36 in the vehicle 10. This processing is executed by the controller 38. In this processing flow, step S100 in the processing flow shown in FIG. 6 is replaced with step S300. In association with replacement with step S300, step S302 is modified from step S102. The other steps are the same as those in the processing flow shown in FIG. 6, thus are denoted by the same reference numerals, and will not be described. In step S300, the controller 38 predicts whether the travel in the EV mode will be made in the future. The travel in the EV mode can be predicted on the basis of the state of the recovery switch 46, for example. If the recovery switch 46 is not in the on state, the normal air volume control, that is, the control for determining the air volume on the basis of the information other than information on prediction of the travel in the EV mode is maintained (S302). If the recovery switch 46 is in the on state, it is considered that the driver currently requests the charging of the battery 26 for the future travel in the EV mode. Accordingly, the travel in the EV mode from the time onward can be predicted from the on state of the recovery switch 46. The controller 38 functions as a rotary electric machine travel predicting section that predicts whether the travel in the EV mode, that is, the travel by the rotary electric machines only will be made in the future.

In addition, the travel in the EV mode may be predicted by another method. For example, in the case where a route that was used in the past by the driver is stored and the travel in the EV mode was made in a section during the travel in the route, the travel in the EV mode can be predicted when the travel in the same route is made. The controller 38 may include a route guiding device for guiding the vehicle along a specified route. The controller 38 stores the traveled route and also stores the section in which the travel in the EV mode was made in the route. In the case where the route that has been traveled in the past is searched and there is a section in the route in which the travel in the EV mode was made, it is predicted that the travel in the EV mode is made in the section.

In addition, the travel in the EV mode may be predicted in accordance with time of day. The EV mode is possibly selected in the early morning or the late night. For example, when the vehicle enters a residential area, there is a case where the EV mode is selected to reduce the travel noise of the vehicle. The controller 38 includes a clock and predicts that the travel in the EV mode will be made in the future when the current time is at a specified time of day. The specified time of day may arbitrarily set by the driver and the like.

Figure 9:
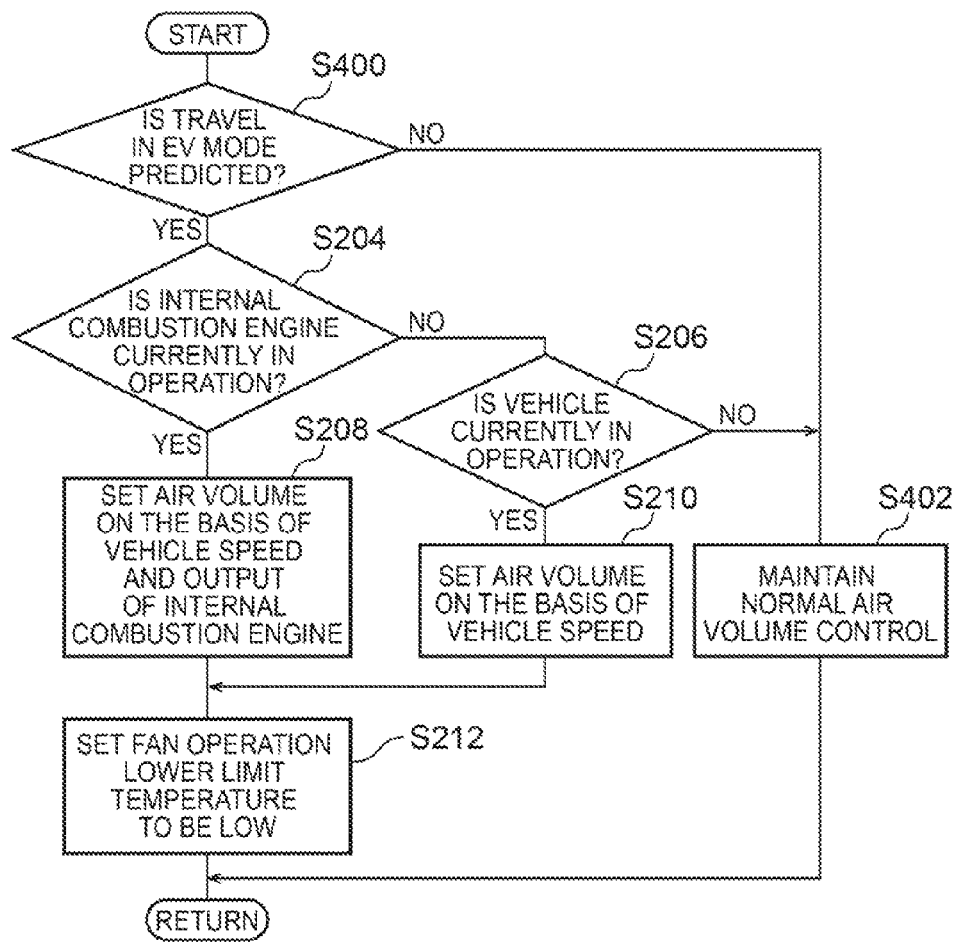
FIG. 9 is a chart of one example of the processing flow for setting the air volume of the cooling fan.

FIG. 9 is a chart of yet another example of the processing flow of the sub routine related to the setting of the operation of the cooling fan 36 in the vehicle. This processing is executed by the controller 38. In this processing flow, step S200 in the processing flow shown in FIG. 7 is replaced with step S400. In association with replacement with step S400, step S402 is modified from step S202. The other steps are the same as those in the processing flow shown in FIG. 7, thus are denoted by the same reference numerals, and will not be described. In addition, steps S400, S402 are steps in which the same processing as steps S300, S302 in FIG. 8 are respectively executed.

In the description so far, the case where the vehicle user rides on the vehicle and operates the vehicle is raised as the example. However, the vehicle user may be outside said vehicle. For example, a remote operation may be performed. In addition, in a vehicle that performs an automated following travel (so-called platooning) in which the vehicle automatically travels by following a vehicle ahead, a driver of the vehicle ahead becomes a user of a following vehicle and can request charging of a battery in the following vehicle.

The recovery switch 46 can be a switch for which a push button, a lever, or the like provided in a vehicle cabin, for example, in an instrument panel is used. In addition, the recovery switch 46 may be a switch that is displayed on a touch panel display device. Furthermore, the recovery switch 46 may be a switch that is not manually operated but is operated when specified voice is input thereto. In the above-described automatic following travel, the recovery switch 46 may be a switch that is operated by wireless communication from the vehicle ahead.

Figure 10:
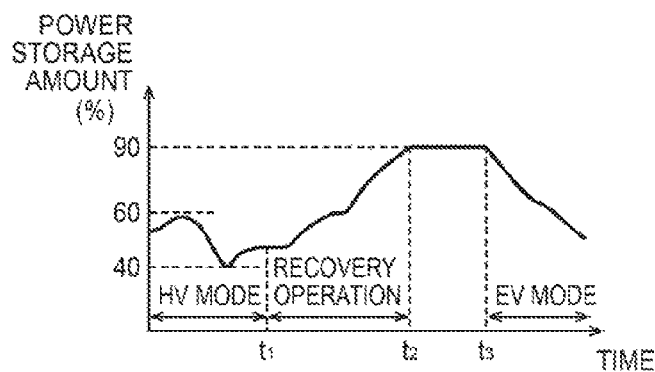
FIG. 10 is a chart of a change in a power storage amount during a travel of the vehicle.

FIG. 10 is a chart in which a status of a change in the power storage amount of the battery 26 is exemplified. During the travel in the HV mode, the power storage amount is managed to fall within the range from 40 to 60%. When the future travel in the EV mode is predicted, such as when the recovery switch 46 is turned into the on state (a time point $t_1$), the recovery operation of the power storage amount is performed. During the recovery operation, each of the prime movers 14, 16, 18 is controlled to promote the charging of the battery 26, and the power storage amount is increased in conjunction with this. When the power storage amount reaches 90% that is an upper limit value defined in advance (a time point $t_2$), the power storage amount is maintained in this state. When the mode switching switch 44 is operated (a time point $t_3$), the travel in the EV mode is started. In the EV mode, the electric power is supplied from the battery 26, and the power storage amount is reduced.

In the description so far, the case where the invention is applied to the plug-in hybrid vehicle has been raised as the example. However, the invention can also be applied to a hybrid vehicle that does not have a charging function from the external power supply (hereinafter, described as a general hybrid vehicle). In a configuration of the general hybrid vehicle, for example, the charging inlet 30 and the charger 34 are removed from the configuration shown in FIG. 1. The general hybrid vehicle is managed such that the power storage amount of the battery falls within a middle range, for example, the range from 40 to 60%. In the general hybrid vehicle, in the case where the driver can select the EV mode, the power storage amount is increased to excess the normal range before the travel in the EV mode. In this way, a travel distance by the EV mode can be extended. Similar to the above-described recovery switch 46, an amount increasing switch for requesting the increase in the power storage amount can be provided. When the driver operates the amount increasing switch, a higher upper limit value (80%, for example) than an upper limit value in the normal power storage amount range is set, and each of the prime movers 14, 16, 18 is controlled in accordance with this setting. Control related to the setting of the operation of the cooling fan 36 can be processed by following the flows shown in FIGS. 7, 9, for example.

Another example of a preferred aspect of the invention will hereinafter be described. A control system for a hybrid vehicle that has: an internal combustion engine and rotary electric machines for driving the vehicle; a battery that receives/transmits the electric power from/to the rotary electric machines; and a cooling fan for cooling the battery has a cooling fan control section that determines an operation of the cooling fan on the basis of plural types of information including presence or absence of a charging request based on an intention of a user. In the case where the charging request by the intention of the user is present, the cooling fan control section controls the operation of the cooling fan such that the battery is cooled more than a case where a value of a variable that is related to the information other than the presence or absence of the charging request by the intention of the user is the same and the charging request by the intention of the user is absent. In another aspect, a control system for a hybrid vehicle that has: an internal combustion engine and rotary electric machines for driving the vehicle; a battery that receives/transmits the electric power from/to the rotary electric machines; and a cooling fan for cooling the battery has: a charging request switch that requests a charging operation of the battery when turned into an on state; and a cooling fan control section that determines an operation of the cooling fan on the basis of plural types of information including an on-off state of the charging request switch. In the case where the charging request switch is in the on state, the cooling fan control section controls the operation of the cooling fan such that the battery is cooled more than a case where a value of a variable related to the information other than the on-off state of the charging request switch is the same and the charging request switch is in the off state. In further another aspect, a control system for a hybrid vehicle that has: an internal combustion engine and rotary electric machines for driving the vehicle; a battery that receives/transmits the electric power from/to the rotary electric machines; and a cooling fan for cooling the battery has: a rotary electric machine travel prediction section that predicts whether a travel by the rotary electric machines only is made in the future; and a cooling fan control section that determines an operation of the cooling fan on the basis of information including a prediction of the travel by the rotary electric machines only. In the case where the travel by the rotary electric machines only is predicted, the cooling fan control section controls the operation of the cooling fan such that the battery is cooled more than a case where a value of a variable that is related to information other than the prediction of the travel by the rotary electric machines only is the same and the travel by the rotary electric machines only is not predicted.

What is claimed is:

1. A control system for a hybrid vehicle, the control system comprising:
   an internal combustion engine for driving the vehicle;
   a rotary electric machine for driving the vehicle;
   a battery configured to receive electric power from the rotary electric machine and transmit electric power to the rotary electric machine;
   a cooling fan configured to cool the battery; and
   a controller configured to determine an operation of the cooling fan based on charged-discharged electric power of the battery and presence or absence of a charging request that is based on an intention of a user, the controller being configured to control the operation of the cooling fan such that the battery is cooled more in a case of i) below than in a case of ii) with a same charged-discharged electric power, wherein a charged-discharged electric power of the battery when the charging request is present is equal to a charged-discharged electric power of the battery when the charging request is absent,
   i) the charging request is present, and
   ii) the charging request is absent.

2. A control system for a hybrid vehicle, the control system comprising:
   an internal combustion engine for driving the vehicle;
   a rotary electric machine for driving the vehicle;
   a battery configured to receive electric power from the rotary electric machine and transmit electric power to the rotary electric machine;
   a cooling fan configured to cool the battery; and
   a switch configured to issue a command of an increasing operation of a power storage amount of the battery; and
   a controller configured to determine an operation of the cooling fan based on charged-discharged electric power of the battery and an on-off state of the switch, the controller being configured to control the operation of the cooling fan such that the battery is cooled more in a case of i) below than in a case of ii) with a same charged-discharged electric power, wherein a charged-discharged electric power of the battery when the charging request is present is equal to a charged-discharged electric power of the battery when the charging request is absent, i) the switch is in the on state, and ii) the switch is in the off state.

3. A control system for a hybrid vehicle, the control system comprising:

an internal combustion engine for driving the vehicle;

a rotary electric machine for driving the vehicle;

a battery configured to receive electric power from the rotary electric machine and transmit electric power to the rotary electric machine;

a cooling fan configured to cool the battery; and a controller configured to predict whether a travel only by the rotary electric machine will be made in a future and configured to determine an operation of the cooling fan based on charged-discharged electric power of the battery and a prediction of the travel only by the rotary electric machine, the controller being configured to control the operation of the cooling fan such that the battery is cooled more in a case of i) below than in a case of ii) with a same charged-discharged electric power, wherein a charged-discharged electric power of the battery when the charging request is present is equal to a charged-discharged electric power of the battery when the charging request is absent, i) the travel only by the rotary electric machine is predicted, and ii) the travel only by the rotary electric machine is not predicted.

4. The control system according to claim 1, wherein the controller is configured to set a lower limit temperature at which the cooling fan is operated to be lower in the case of i) than in the case of ii).

5. The control system according to claim 1, wherein the controller is configured to control an air volume of the cooling fan to be larger in the case of i) than in the case of ii).

6. The control system according to claim 4, wherein the controller is configured to obtain a speed of the vehicle, and the controller is configured to increase an air volume of the cooling fan as a vehicle speed becomes higher in the case of i).

7. The control system according to claim 5, wherein the controller is configured to obtain a speed of the vehicle, and the controller is configured to increase the air volume of the cooling fan as the vehicle speed becomes higher in the case of i).

8. The control system according to claim 4, wherein the controller is configured to obtain output of the internal combustion engine, and the controller is configured to increase an air volume of the cooling fan as output of the internal combustion engine becomes higher in the case of i).

9. The control system according to claim 4, wherein the hybrid vehicle is configured to travel by switching between an EV mode and an HV mode, the EV mode is a mode in which the vehicle is driven only by the rotary electric machine, the HV mode is a mode in which the vehicle is driven by selectively using or using both of the rotary electric machines and the internal combustion engine in accordance with a situation, and the controller is configured to increase an air volume of the cooling fan as output of the internal combustion engine becomes higher, in the case of i) and the vehicle travels in the HV mode.

10. The control system according to claim 2, wherein the controller is configured such that when the rotary electric machines are predicted to be operated at a high output in the future, based on a charging request of the battery from the user, the on state of the switch for commanding an increase in the power storage amount, and the prediction of the travel by the rotary electric machine only, the temperature increase of the battery during the high output operation is suppressed by suppressing the temperature increase of the battery before the high output operation.

* * * * *